United States Patent [19]

Nishi

[11] 4,214,885

[45] Jul. 29, 1980

[54] METHOD FOR PRODUCING MINIATURE LAMPS

[76] Inventor: Hideo Nishi, 919 Shimosakunobe, Takatsu-Ku, Kawasaki-City, Kanagawa-Prefecture, Japan

[21] Appl. No.: 882,653

[22] Filed: Mar. 1, 1978

[51] Int. Cl.[2] .................... C03C 27/02

[52] U.S. Cl. .................... 65/42; 65/59 R

[58] Field of Search .................... 65/42, 43, 59 R, 59 A

[56] References Cited

U.S. PATENT DOCUMENTS

| | | | |
|---|---|---|---|
| 2,093,491 | 9/1937 | Shermund | 65/59 A X |
| 2,832,016 | 4/1958 | Bakalar | 65/42 X |
| 2,877,392 | 3/1959 | Koets et al. | 65/42 X |

*Primary Examiner*—Arthur D. Kellogg

[57] ABSTRACT

Method for producing miniature lamps comprising the steps of heating a stem by radiation such as infrared rays by which inner periphery of a glass tube contacting the stem is melted, said heating is performed in the vacuum atmosphere, and at the same time shielding the other parts of the glass tube that do not contact the stem from the radiation, and cooling said other parts of the glass tube by the radiation between the other parts and a boat made of metals, whereby miniature lamps used in a wrist watch are produced with good efficiency.

1 Claim, 3 Drawing Figures

METHOD FOR PRODUCING MINIATURE LAMPS

BACKGROUND OF THE INVENTION

1. Field of the Invention

The field of art to which the invention pertains includes "Method for producing miniature lamps" at one time with good efficiency.

2. Description of the Prior Art

There is a method for producing miniature lamps such as described in the Japanese Pat. No. 458,362 titled as the method for producing electric lamps that is very excellent method. However, there is no method with respect to produce electric miniature lamps of tube style which respectively have lead wires at both ends of the miniature lamp. These electric miniature lamps of tube style are used in a wrist watch, electronic apparatuses of miniature style, and ornaments. Therefore, the miniature lamps of tube style have a diameter 1 mm or less and a length of 5 mm or less. Such method for producing electric miniature lamps as described in the invention disclosed in the patent of Japanese Pat. No. 458,362 is the method to produce an electric miniature lamp having a lead wire at one end thtereof, therefore, it is not applied to the electric miniature lamp having a lead wire at both ends of the tube.

BRIEF SUMMARY OF INVENTION

Accordingly, it is an object of the present invention to provide a new method to produce an electric miniature lamp having a lead wire at both ends thereof.

Another object of the present invention is to produce many electric miniature lamps at one time with good efficiency.

A further object of the present invention is to provide a new method to produce an electric miniature lamp of tube style that has less deformation of the tube by radiation heat.

Other objects and aspects of the present invention will become apparent from the description described in the following embodiment with reference to the accompanying drawing in which.

DETAILED DESCRIPTION

Figure 1:
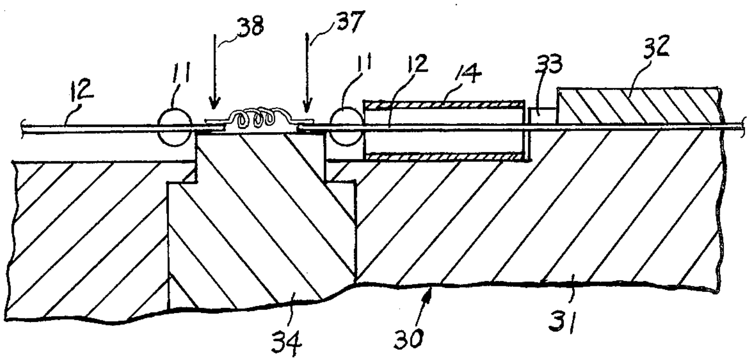
FIG. 1 shows a step of mounting according to the present invention.
Figure 2:
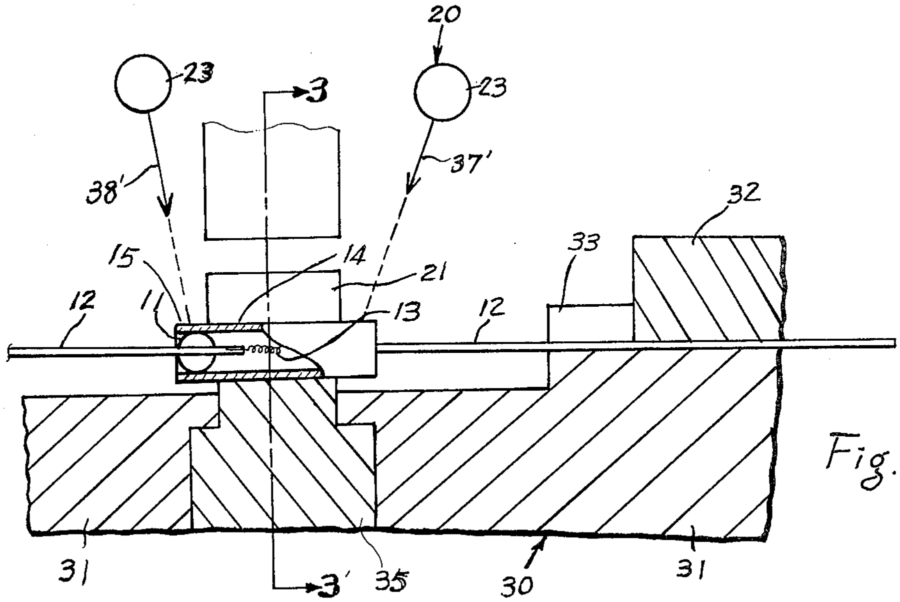
FIG. 2 shows the mounted lead wire with a glass bead mounted and covered by a glass tube with a diameter of 1 mm or less.
Figure 3:
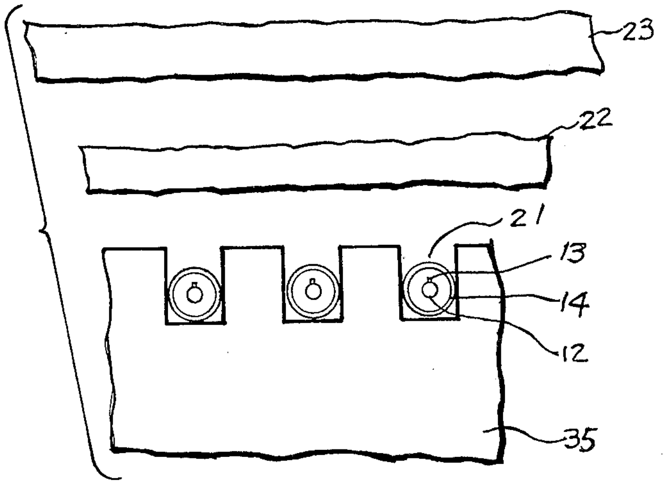
FIG. 3 shows a sectional view cut along 3—3' of FIG. 2.

Refering to the attached drawings, in FIG. 1, there is shown a step of mounting according to the present invention wherein tungsten filament is mounted by a lead wire 12,12 respectively at both ends thereof respectively covered by a glass bead 11,11. The mounted portions of the tungsten filament and the lead wire are sustained by a mounting block 34 between which and the glass tube 14 heat is transmitted by radiation and the deformation of the tube 14 can be prevented. The numeral 13 indicates the tungsten filament. The numerals 37',38' show respectively radiation from a light source 20. The numeral 23 shows a heater. The numeral 32 denotes a supporting tool of the lead wire. The numeral 33 denotes a groove to set the lead wire in position. The supporting tool 32 fixes the lead wire in the position in the steps. The numerals 37,38 respectively show the directions to which the tungusten filament and the lead wire are pressed against the block 34, whereby the tungsten filament is connected to the lead wire. The numeral 30 denotes a block to support a group of parts composed of the tungsten filament pressed to the lead wire 12,12 at both ends thereof, two beads of glass respectively having the lead wires 12,12 therethrough and the glass tube 14. The numeral 31 denotes one element of the block 30. In FIG. 2 there is shown the mounted lead wire 12,12 with the glass beads 11,11 covered by the glass thbe 14 with a diameter of 1 mm or less. The numeral 21 denotes a groove which set the glass tube 14 in position. The numeral 22 denotes a shielder which shields the glass tube 14 from the radiation and controls the transmission of heat to the glass tube 14. The numeral 35 denotes a block for enclosure. The numeral 10 shows a group of parts composed of tungsten filament 13 pressed to the lead wire 12,12 at both ends thereof, two beads of glass 11,11 respectively having the lead wires 12,12 at both ends of the glass tube 14 therethrough and the glass tube 14 with a diameter of 1 mm or less. The numeral 15 denotes the shield portion where the glass beads 11 and the inner periphery of the glass tube 14 is in contact with each other. FIG. 3 shows a sectional view cut along 3—3' line shown in FIG. 2 where the relation between the tungsten filament 13 and lead wires 12 is well shown.

The steps of the method according to the present invention are composed of mainly two steps which are pre-construction step and enclosure step. In FIG. 1, there is shown an embodiment of the method of pre-construction. The lead wire 12 is set in the groove 33 and fixed by the supporting tool 32. Before setting the glass tube 14 is inserted through by the lead wire 12. The bead 11 is fixed at the end of the lead wire 12. The tungusten wire 13 is positoned on the end of lead wire 12 and pressed to the direction of the arrow 37 and 38, whereby the connection between the tungusten wire and the lead wire 12 is accomplished. Then the glass tube 14 is moved to the left wards and covers the combination of the lead wire 12, the tungusten wire 13 and the lead wire 12. After accomplishment of pre-construction step, the mounting block 34 is removed and instead of the mounting block 34, the block for enclosure is set which is numbered as 35 in FIG. 2. The glass tube 14 may be moved to the left wards after the mounting block 34 is removed and the block for enclosure is set in stead of the mounting block 34. In the second step of enclosure step the seal portion 15 is set to be at the outside of the block for enclosure 35. Then the radiation of infrared rays is applied to the seal portion 15. The glass beads 11,11 are heated by the internal reflection of the infrared rays and the internal periphery of the glass tube 14 is melted, whereby the electric miniature lamp of tube style is produced. The other part than the seal portion 15 is shielded from the radiation of the infrared rays. The enclosure step is proceeded under vacuum atmosphere and the gas in the glass tube is excluded through the gap between the glass bead and the glass tube. The heat in the glass tube is transmitted to the block for enclosure 35 by the radiation between the glass tube 14 and the block for enclosure 35 and the deformation of the glass tube caused by the heat for enclosure is very small. The block for enclosure 35 can support one hundred of the glass tubes 14 and more and at one time, one hundred and more glass tube style electric miniature lamps can be produced.

Although the invention has been described in its prefered form with a certain degree of particularity, it is understood that the present invention disclosure of the prefered form may be changed in the details of construction and the combination and arrangement of parts may be resorted to without departing from the spirit and the scope of the invention as hereinafter claimed.

What is claimed is:

1. Method for producing miniature lamps comprising the steps of heating a glass bead of a stem by radiation such as infrared rays, the glass bead being heated up to the melted state thereof by the internal reflection of the infrared rays, melting the inner periphery of the glass tube around the glass bead, said heating being performed in the vacuum atmosphere, and at the same time shielding the other part of the glass tube that does not contact the glass bead and cooling said other part of the glass tube by the radiation between the other part of the glass tube and the block for enclosure.

* * * * *